United States Patent
Laine et al.

(10) Patent No.: US 9,900,147 B2
(45) Date of Patent: Feb. 20, 2018

(54) HOMOMORPHIC ENCRYPTION WITH OPTIMIZED HOMOMORPHIC OPERATIONS

(71) Applicant: Microsoft Technology Licensing, LLC, Redmond, WA (US)

(72) Inventors: Kim Laine, San Mateo, CA (US); Nathan P. Dowlin, Chelsea, VT (US); Ran Gilad-Bachrach, Bellevue, WA (US); Michael Naehrig, Sammamish, WA (US); John Wernsing, Redmond, WA (US); Kristin E. Lauter, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 14/975,528

(22) Filed: Dec. 18, 2015

(65) Prior Publication Data

US 2017/0180115 A1    Jun. 22, 2017

(51) Int. Cl.
 H04L 29/06    (2006.01)
 H04L 9/00    (2006.01)
 H04L 9/06    (2006.01)
 H04L 9/30    (2006.01)

(52) U.S. Cl.
 CPC ............ H04L 9/008 (2013.01); H04L 9/0618 (2013.01); H04L 9/3093 (2013.01)

(58) Field of Classification Search
 CPC .............................. H04L 9/008; H04L 9/0618
 See application file for complete search history.

(56) References Cited

U.S. PATENT DOCUMENTS

| 8,515,058 B1 | 8/2013 | Gentry |
| 8,565,435 B2 | 10/2013 | Gentry et al. |
| 8,861,716 B2 | 10/2014 | Halevi et al. |
| 8,925,075 B2 | 12/2014 | Krendelev et al. |

(Continued)

FOREIGN PATENT DOCUMENTS

| CN | 103425933 A | 12/2013 |
| WO | WO2012158621 A1 | 11/2012 |

(Continued)

OTHER PUBLICATIONS

Bergh, Petter Andreas, "Ext-symmetry over quantum complete intersections", Archives of Mathematics, May 2009, 6 pages.

(Continued)

*Primary Examiner* — Dao Ho
(74) *Attorney, Agent, or Firm* — Schwegman Lundberg & Woessner, P.A.

(57) ABSTRACT

The techniques and/or systems described herein are directed to improvements in homomorphic operations within a homomorphic encryption scheme. The homomorphic operations may be performed on encrypted data received from a client device without decrypting the data at a remote computing device, thereby maintaining the confidentiality of the data. In addition to the operations of addition, subtraction, and multiplication, the homomorphic operations may include an approximate division, a sign testing, a comparison testing, and an equality testing. By combining these operations, a user may perform optimized operations with improved processor and memory requirements.

20 Claims, 6 Drawing Sheets

(56) References Cited

U.S. PATENT DOCUMENTS

| | | | |
|---|---|---|---|
| 8,958,555 | B2 | 2/2015 | Gentry et al. |
| 8,972,742 | B2 | 3/2015 | Troncoso Pastoriza et al. |
| 9,083,526 | B2 | 7/2015 | Gentry |
| 2004/0078407 | A1* | 4/2004 | Naslund .................. G06F 7/724 708/492 |
| 2004/0086113 | A1* | 5/2004 | Lauter ..................... G06F 7/725 380/28 |
| 2004/0143403 | A1 | 7/2004 | Brandon et al. |
| 2012/0201378 | A1 | 8/2012 | Nabeel et al. |
| 2013/0097417 | A1 | 4/2013 | Lauter et al. |
| 2013/0150253 | A1 | 6/2013 | Deciu et al. |
| 2013/0170640 | A1 | 7/2013 | Gentry |
| 2013/0216044 | A1 | 8/2013 | Gentry et al. |
| 2014/0177828 | A1 | 6/2014 | Loftus et al. |
| 2015/0154406 | A1 | 6/2015 | Naehrig et al. |
| 2015/0213079 | A1 | 7/2015 | Shukla et al. |
| 2016/0110500 | A1 | 4/2016 | Wang et al. |

FOREIGN PATENT DOCUMENTS

| | | |
|---|---|---|
| WO | WO2013067542 A1 | 5/2013 |
| WO | WO2015112859 A1 | 7/2015 |

OTHER PUBLICATIONS

Betley, et al., "The cyclotomic trace and curves on K-theory", Topology, Pergamon, Jul. 2005, 30 pages.
Bos et al., "Leveled Homomorphic Encryption with Smaller Ciphertexts", unknown publication date, 18 pages.
Boyar et al., "A depth-16 circuit for the AES-box", National Institute of Standards and Technology, Dec. 2011, 11 pages.
Brakerski et al., "Fully Homomorphic Encryption from Ring-LWE and Security for Key Dependent Messages", Proceedings of the 31st annual conference on Advances in cryptology, Aug. 2011, 20 pages.
Brakerski, Zvika, "Fully Homomorphic Encryption without Modulus Switching from Classical GapSVP", Stanford University, CRYPTO 2012, Aug. 2012, 20 pages.
Brakerski et al., "Fully Homomorphic Encryption without Bootstrapping", Association for Computing Machinery, Jan. 2008, 27 pages.
Duan et al., "Practical Private Computation and Zero-Knowledge Tools for Privacy-Preserving Distributed Data Mining", Proc 2008 SIAM Intl Conf on Data Mining, Apr. 2008, 12 pages.
Gentry et al., "Homomorphic Evaluation of the AES Circuit", International Association for Cryptologic Research, Jun. 15, 2012, 34 pages.
Gentry et al., "Better Bootstrapping in Fully Homomorphic Encryption", Public Key Cryptography, Dec. 15, 2011, 22 pages.
Gentry et ai.,"Fully Homomorphic Encryption with Polylog Overhead", International Association for Cryptologic Research, Oct. 2011, 40 pages.
Graepel et al., "ML Confidential: Machine Learning on Encrypted Data", Proc 15th intl conf on Information Security and Cryptology, Sep. 2012, 10 pages.
International Search Report and Written Opinion received for PCT Patent Application No. PCT/US2013/077348, dated Jun. 30, 2014, 18 pages.
Oracle, "Platform-as-a-Service Private Cloud with Oracle Fusion Middleware", An Oracle White Paper, Oct. 2009, 20 pages (Author unknown).
Qin et al., "An FPGA Design of AES Encryption Circuit with 128-bit Keys", GLSVLSI'05, Apr. 2005, 5 pages.
Ramaekers, Coen, "Fully Homomorphic Encryption in JCrypTool", Aug. 4, 2011, 85 pages.
Smart et al., "Fully Homomorphic SIMD Operations", Designs, Codes and Cryptography, Apr. 2014, vol. 71, Issue 1, 19 pages.
Stehle et al., "Making NTRU as Secure as Worst-Case Problems over Ideal Lattices", Advances in Cryptology, Eurocrypt 2011, May 2011, 21 pages.

Ayday et al, "Privacy Enhancing Technologies for Medical Tests Using Genomic Data", 20th Network and Distribution System Security Symposium, Feb. 2013, 3 pgs.
Ayday et al, "Privacy Preserving Computation of Disease Risk by Using Genomic, Clinical, and Environmental Data", USENIX Security Workshop on Health Information Technologies, Aug. 2013, 10 pgs.
Basilakis, et al., "The Potential for Machine Learning Analysis over Encrypted Data in Cloud-based Clinical Decision Support—Background and Review", Proceedings of the 8th Australasian Workshop on Health Informatics and Knowledge Management, Jan. 27, 2015, pp. 3-13.
Boneh et al, "Private Database Queries Using Somewhat Homomorphic Encryption", Applied Cryptography and Network Security, Jun. 2013, 21 pgs.
Bos, et al., "Private Predictive Analysis on Encrypted Medical Data", In Journal of Biomedical Informatics, May 2015, 20 pages.
Clarke et al, "Basic Statistical Anaylsis in Genetic Case Control Studies", Nat Protoc, vol. 6, Feb. 2011, 28 pgs.
Domingo-Ferrer, et al., "Privacy Homomorphisms for Social Networks With Private Relationships", In Proceedings of the International Journal of Computer and Telecommunications Networking, Jul. 28, 2008, pp. 1-10.
Doroz, et al., "Accelerating Fully Homomorphic Encryption in Hardware", Published on: Sep. 2013, Available at: http://ecewp.ece.wpi.edu/wordpress/vernam/files/2013/09/Accelerating-Fully-Homomorphic-Encryption-in-Hardware.pdf, 14 pgs.
Fan, et al., "Somewhat Practical Fully Homomorphic Encryption", In Journal of IACR Cryptology ePrint Archive, May 7, 2012, 19 pages.
Furihata et al, "Test of Association Between Haplotypes andPhenotypes in Case Control Studies: Examination of Validity of the Application of an Algorithm for Samples from Cohort or Clinicial trials to Case Control Samples Using Simulated and Real Data", Genetics, vol. 174, Issue 3, Nov. 2006, 12 pgs.
Gentry, "A Fully Homomorphic Encryption Scheme", Sep. 2009 Dissertation, 209 pgs.
Hu, et al., "Improving the Efficiency of Homomorphic Encryption Schemes", In Thesis of Electrical and Computer Engineering, May 2013, 103 pages.
PCT Intl Search Report and Written Opinion for PCT/US2014/066992, dated Mar. 10, 2015, 12 pages.
Lauter et al, "Can Homomorphic Encryption be Practical?", Proc 3rd ACM workshop on Cloud Computing Security Workshop, Oct. 2011, 12 pgs.
Lauter et al "Private Computation on Encrypted Genomic Data", Proc Privacy Enhancing Technologies Symposium, Workshop on Genome Privacy, Jul. 2014, 21 pgs.
Lopez-Alt et al, "On the Fly Multiparty Computation on the Cloud via Multikey Fully Homomorphic Encryption" Proc 14th ACM Symposium on Theory of Computing, May 2012, 73 pgs.
Stehle et al., "Faster Fully Homomorphic Encryption", Chapt, Advances in Cryptology, ASIACRYPT 2010, vol. 6477 of series Lecture Notes in Computer Science, Sep. 2010, 25 pgs.
Wang, et al., "Accelerating Fully Homomorphic Encryption Using GPU", In Proceedings of IEEE Conference on High Performance Extreme Computing, Sep. 10, 2012, 5 pages.
Wang, et al., "Exploring the Feasibility of Fully Homomorphic Encryption", Published on: Dec. 2012, Available at: http://ecewp.ece.wpi.edu/wordpress/crypto/files/2012/12/journal0705.pdf, 8 pgs.
Xie, et al., "Crypto-Nets: Neural Networks Over Encrypted Data", In Proceedings of 3rd International Conference on Learning Representations, May 7, 2015, pp. 1-9.
Yasuda et al, "Secure Pattern Matching using Somewhat Homomorphic Encryption", Proc ACM Workshop on Cloud Computing Security , Nov. 2013, 12 pgs.
Cetin et al, "An Investigation of Complex Operations with Word-Size Homomorphic Encryption", Dec. 2015, Cryptology ePrint Archive, Report 2015/1195, 16 pgs.
Ayday, et al., "Personal use of the genomic data: Privacy vs. storage cost", In Proceedings of IEEE Global Communications Conference, Dec. 9, 2013, pp. 2723-2729.

(56) References Cited

OTHER PUBLICATIONS

Bos, et al., "Improved Security for a Ring-Based Fully Homomorphic Encryption Scheme", In Proceedings of 14th IMA International Conference on Cryptography and Coding, Dec. 17, 2013, 30 pages.
Bosma, et al., "The Magma Algebra System I: The User Language", In Journal of Symbolic Computation, vol. 24, Issue 3-4, Sep. 1997, pp. 235-265.
Brakerski, et al., "(Leveled) Fully Homomorphic Encryption without Bootstrapping", ACM Transactions on Computation Theory, vol. 6, No. 3, Article 13, Jul. 2014, 36 pgs.
Brakerski, et al., "(Leveled) Fully Homomorphic Encryption without Bootstrapping", In Proceedings of 3rd Innovations in Theoretical Computer Science Conference, Jan. 8, 2012, pp. 309-325.
Brakerski, et al., "Classical Hardness of Learning with Errors", In Proceedings of Forty-Fifth Annual ACM Symposium on Theory of Computing, Jun. 1, 2013, pp. 575-584.
Brakerski, et al., "Efficient Fully Homomorphic Encryption from (Standard) LWE", In Proceedings of IEEE 52nd Annual Symposium on Foundations of Computer Science, Oct. 22, 2011, pp. 97-106.
Brakerski, et al., "Lattice-based FHE as Secure as PKE", In Proceedings of 5th Conference on Innovations in Theoretical Computer Science, Jan. 12, 2014, pp. 1-12.
Brakerski, et al., "Packed Ciphertexts in LWE-Based Homomorphic Encryption", In Proceedings of 16th International Conference on Practice and Theory in Public-Key Cryptography, Sep. 2012 , pp. 1-12.
Cheon, et al., "Homomorphic Computation of Edit Distance", In Proceedings of 3rd Workshop on Encrypted Computing and Applied Homomorphic Cryptography, Jan. 30, 2015, pp. 1-16.
Dijk, et al., "Fully homomorphic encryption over the integers", In Proceedings of 29th Annual International Conference on the Theory and Applications of Cryptographic Techniques, May 30, 2010, 21 pages.
Dowlin, et al, "Manual for Using Homomorphic Encryption for Bioinformatics", Nov. 2015 retrieved from the Internet, <<https://www.microsoft.com/en-us/research/publication/manual-for-using-homomorphic-encryption-forbioinformatics/>>, Proc of IEEE, vol. 105, Issue 3, Mar. 2017, pp. 1-18.
Eisenbud, David., "Commutative Algebra: with a view toward algebraic geometry", Book, Chapt 2, 2.6 Exercises, pp. 79-86, Mar. 30, 1995.
Festa, et al., "Nuclear Magnetic Resonance Lipoprotein Abnormalities in Prediabetic Subjects in the Insulin Resistance Atherosclerosis Study", In Journal of Circulation, vol. 111, Issue 25, Jun. 28, 2005, pp. 3465-3472.
Gentry, Craig, "Fully Homomorphic Encryption Using Ideal Lattices", In Proceedings of Forty-First Annual ACM Symposium on Theory of Computing, May 31, 2009, pp. 169-178.
Gentry, et al., "Homomorphic Encryption from Learning with Errors: Conceptually-Simpler, Asymptotically-Faster, Attribute-Based", In Proceedings of 33rd Annual Cryptology Conference on Advances in Cryptology, vol. 8042, Jun. 8, 2013, pp. 1-25.
Gentry, et al., "Homomorphic Evaluation of the AES Circuit", In Proceedings of 32nd Annual Cryptology Conference, Jan. 3, 2015, 35 pages.
Halevi et al., "Design and Implementation of a Homomorphic Encryption Library", Nov. 30, 2012, retrieved from http://researcher.ibm.com/researcher/files/us-shaih/he-library.pdf, 42 pgs.
International Search Report and Written Opinion received for PCT Patent Application No. PCT/US2016/060027, dated Feb. 22, 2017, 12 pages.
International Search Report and Written Opinion received for PCT Patent Application No. PCT/US2016/060038, dated Feb. 23, 2017, 12 pages.
Kim, et al., "Private Genome Analysis through Homomorphic Encryption", In Journal of BMC medical informatics and decision making, vol. 15, Dec. 2015, pp. 1-18.
Lepoint et al. "A Comparison of the Homomorphic Encryption Schemes FV and YASHE", In Proceedings of 7th International Conference on Cryptology in Africa, May 28, 2014, pp. 1-18.
Linder, et al., "Better Key Sizes (and Attacks) for LWE-Based Encryption", In Proceedings of the 11th international conference on Topics in cryptology, Nov. 30, 2010, pp. 1-21.
Lyubashevsky, et al, "On Ideal Lattices and Learning with Errors over Rings", 2010, retrieved from the Internet, <<http://link.springer.com.chapter/10.1007/978-3-642-13190-5—1>>, Annual Intl Conf on Theory and Applications of Cryptographic Techniques, Eurocrypt May 2010, pp. 1-23.
McLaren, et al., "Privacy-preserving genomic testing in the clinic: a model using HIV treatment", In Journal of Genetics in Medicine, Jan. 14, 2016, pp. 1-9.
Micciancio, et al., "Trapdoors for Lattices: Simpler, Tighter, Faster, Smaller", In Proceedings of 31st Annual International Conference on the Theory and Applications of Cryptographic Techniques, Apr. 15, 2012, 18 pages.
Office action for U.S. Appl. No. 14/934,039, dated Feb. 27, 2017, Laine et al., "Homomorphic Encryption with Optimized Parameter Selection",17 pages.
Okamoto, et al, "Homomorphic Encryption and Signatures from Vector Decomposition", 2008, Retrived from the Internet, <<http://link.springer.com/chapter/10.1007/978-3-540-85538-5_4>>, Intl Conf on Pairing Based Cryptography, Sep. 2008, pp. 58-74.
Peikert, Chris, "Public-key cryptosystems from the worst-case shortest vector problem", In Proceedings of the forty-first annual ACM symposium on Theory of computing, May 31, 2009, pp. 333-342.
Pol, et al., "Estimating key sizes for high dimensional lattice-based systems", In Proceedings of 14th IMA International Conference on Cryptography and Coding, Dec. 17, 2013, pp. 1-11.
"R: A Language and Environment for Statistical Computing", In Publication of R Foundation for Statistical Computing, Nov. 30, 2009, 3503 pages.
Regev, Oded, "On lattices, learning with errors, random linear codes, and cryptography", In Journal of the ACM, vol. 56, Issue 6, Sep. 2009, 40 pages.
Tabaei, et al., "A multivariate logistic regression equation to screen for diabetes development and validation", In Journal of Diabetes Care, vol. 25, No. 11, Nov. 2002, pp. 1999-2003.
Torres, et al., "Effectiveness of Fully Homomorphic Encryption to Preserve the Privacy of Biometric Data", In Proceedings of the 16th International Conference on Information Integration and Web-based Applications & Services, Dec. 4, 2014, 7 pages.
U.S. Appl. No. 14/934,039, Lauter, et al., "FHELib: Homomorphic Encryption with Optimized Encodings and Parameter Selection", filed Nov. 5, 2015.
U.S. Appl. No. 14/934,048, Lauter, et al., "FHELib: Homomorphic Encryption with Optimized Encodings and Parameter Selection", filed Nov. 5, 2015.
Wang, et al., "Efficient Genome-Wide, Privacy-Preserving Similar Patient Query based on Private Edit Distance", In Proceedings of the 22nd ACM SIGSAC Conference on Computer and Communications Security, Oct. 12, 2015, 12 pages.
Wang, et al., "HEALER: Homomorphic computation of exact logistic regression for secure rare disease variants analysis in GWAS", In Journal of Bioinformatics, vol. 32, Issue 2, Oct. 6, 2015, 8 pages.
Zhang, et al., "FORESEE: Fully Outsourced secuRe gEnome Study basEd on homomorphic Encryption", In Journal of BMC Medical Informatics and Decision Making, vol. 15, Dec. 21, 2015, pp. 1-14.

* cited by examiner

HOMOMORPHIC ENCRYPTION WITH OPTIMIZED HOMOMORPHIC OPERATIONS

BACKGROUND

The development of cloud storage and services has allowed users to offload and/or outsource both storage of their data and associated computations on that data. As a result, businesses can choose to forego the expensive proposition of maintaining their own data centers, relying instead on cloud storage and computational services. In addition to storing data in remote servers, computations can be performed in remote servers as well.

Maintaining data confidentiality is an especially important concern for storing data and performing computations on data in remote servers. Encryption schemes represent one form of technology directed towards securing data when stored in memory, when operated on, and/or transmitted over networks.

SUMMARY

The techniques and/or systems described herein are directed to improvements in homomorphic operations to improve processing speed and storage requirements. For example, the techniques and/or systems can be used on homomorphically encoded and encrypted data received from a client device, to be operated on while maintaining confidentiality of data. The homomorphic operations, including approximate division, sign testing, comparison testing, and equality testing can provide flexible tools for performing secure operations on encrypted data.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
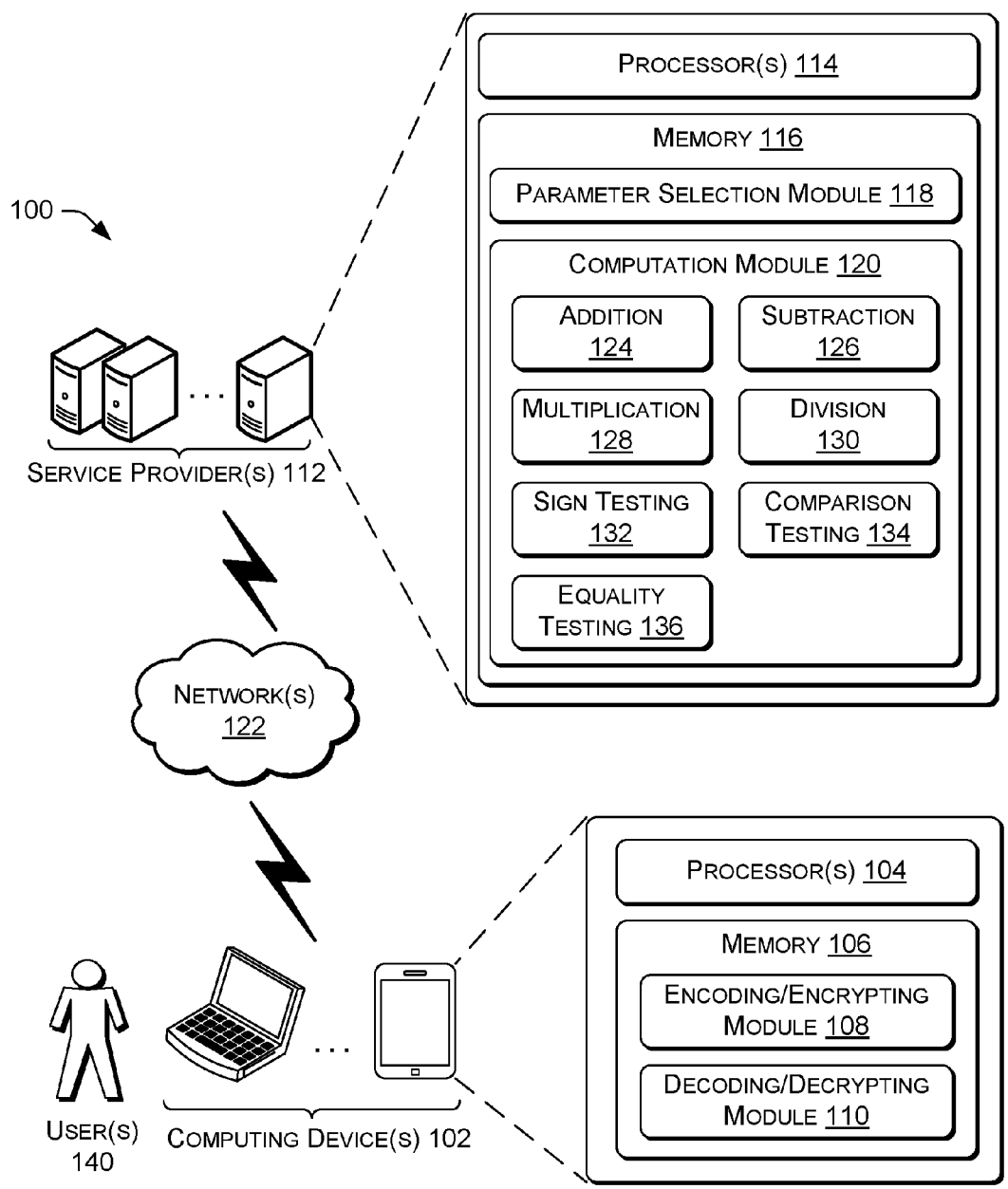
FIG. 1 illustrates an example environment for managing secure computations on encrypted data.

The techniques and/or systems described herein provide improved homomorphic encryption with optimized homomorphic operations. The optimized homomorphic operations include approximate division using plain modulus switching, sign testing (e.g., positive or negative) on encrypted data, comparison testing (e.g., greater than/less than) on encrypted data, and equality testing (e.g., $n_1 = n_2$) on encrypted data. The techniques and/or systems described herein can be used in fully homomorphic encryption, partial homomorphic encryption, and practical homomorphic encryption.

Fully Homomorphic Encryption (FHE) refers to an encryption scheme that allows an untrusted server to execute arbitrary computation on encrypted data on behalf of a computing device often referred to as a client. Solutions for constructing an FHE scheme can incur significant costs due to a reliance on certain mathematical concepts (e.g., ideal lattices) to evaluate any function on encrypted data. In practice, these constructions can be improved using techniques, such as those related to batch-wise or bit-wise encryption, but often remain unworkable for a number of reasons, for example, necessitating deep circuits, such as those based on symmetric encryption standards, and/or substantial storage space to process ciphertexts. While some FHE constructions are capable of computing block ciphers homomorphically, evaluating a single block using these constructions can be several orders of magnitude slower in terms of throughput and latency when compared to evaluating a single block non-homomorphically.

The techniques and/or systems described herein can improve a functioning of a computing device by reducing an amount of processing and/or by reducing an amount of memory required for performing computations on encrypted data. For example, the approximate division techniques discussed herein can reduce a number of multiplication steps or obviate multiplication operations all together, thereby reducing the computational complexity of homomorphic operations. By way of another example, the sign testing, comparison testing, and equality testing can provide flexible operations that can be used individually or combined in any manner to reduce an amount of processing or memory required to perform homomorphic operations. The techniques and/or systems discussed herein can improve the functioning of a computer and/or a network by improving the security of the data transmitted, operated on, and stored in a network. For example, the techniques described herein can allow encrypted data to be transmitted, operated on, and a result can be obtained, all without requiring the data to be decrypted or decoded on a remote server, thereby ensuring a confidentiality of the data. Further, the techniques and/or systems described herein allow clients to outsource computations to a network computer when a client does not have all the data required to run an algorithm.

Various examples for implementing homomorphic encryption with optimized homomorphic operations are described herein with reference to FIGS. 1-6.

FIG. 1 illustrates an example environment 100 that is usable to implement the techniques and/or systems associated with the homomorphic encryption scheme described herein. The environment 100 includes computing device(s) 102 having processor(s) 104 and a memory 106 including an encoding/encrypting module 108 and a decoding/decrypting module 110. In various embodiments, the encoding/encrypting module 108 can include one or more programs or hardware that operates to encode and/or encrypt data in a scheme for secure remote computation. The environment 100 also includes service provider(s) 112 to provide one or more services to the computing device 102, such as the secure remote computing. To that end, the service provider 112 can include processor(s) 114 and a memory 116 including a parameter selection module 118 and a computation module 120 to provide the secure remote computing, which is explained in connection with the figures provided in this disclosure.

The computing device 102 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 102 can include one or more processor(s) 104 and memory 106. The processor(s) 104 can be a single processing unit or a number of units, each of which could include multiple different processing units. The processor(s) 104 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 104 can be configured to fetch and/or execute computer-readable instructions stored in the memory 106.

The memory 106 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

In various embodiments, the computing device 102 can communicate with the service provider 112 via one or more wired or wireless networks 122, such as the Internet, a Mobile Telephone Network (MTN), or other various communication technologies.

In various embodiments, the memory 106 can include an operating system configured to manage hardware and services within and coupled to the computing device 102 for the benefit of other components and other devices.

The encoding/encrypting module 108 and the decoding/decrypting module 110 can include hardware and/or software components. For example, the encoding/encrypting module 108 and/or the decoding/decrypting module 110 can be implemented by one or more modules stored in the memory 106 and/or by one or more components of the processor(s) 104. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The encoding/encrypting module 108 can perform operations to encode and/or encrypt data in accordance with embodiments of the disclosure. For example, the encoding/encrypting module 108 can utilize parameters generated by the service provider 112 to encode data using the techniques disclosed herein. Further, the encoding/encrypting module 108 can generate a public key based at least in part on the parameters generated by the service provider 112 to encrypt the encoded data.

The decoding/decrypting module 110 can perform operations to decrypt and/or decode data in accordance with embodiments of the disclosure. For example, the decoding/decrypting module 110 can utilize parameters generated by the service provider 112 to generate a secret key for decrypting the encrypted data. Further, the decoding/decrypting module 110 can decode the decrypted data to obtain a plaintext result.

The service provider 112 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 102.

The one or more computing devices of the service provider 112 can include one or more processor(s) 114 and memory 116. The one or more processor(s) 114 can comprise a single processing unit or a number of units, each of which could include multiple different processing units. The one or more processor(s) 114 can include, for example, one or more microprocessors, microcomputers, microcontrollers, digital signal processors, CPUs, GPUs, security processors (e.g., secure cryptoprocessors), etc.

The memory 116 can include a parameter selection module 118 for automatically selecting parameters for implementing the homomorphic encryption scheme. For example, the parameter selection module 118 can receive a program, sequence, or series of operations from the computing device 102, for example, to perform on homomorphically encrypted data. The parameter selection module 118 can determine a plaintext modulus T based on the operations in the user program, for example, by determining a divisor required by the intended operations. Other parameters can be selected by the parameter selection module 118, including but not limited to a length N of a polynomial, a modulus Q, a standard deviation of error $\sigma$, a decomposition bit count W, a base B for encoding integers or real numbers into plaintext polynomials, a desired security level, an allowable error level, and the like. After parameters are generated and/or selected by the parameter selection module 118, the parameters can be transmitted to the computing device 102, to be used by the encoding/encrypting module 108 and/or by the decoding/decrypting module 110.

The memory 116 can also include a computation module 120 to perform computations on encoded and encrypted data received from the computing device 102. For example, the computation module 120 can be a program such as a machine learning program, a prediction engine, an image analysis program, a financial program, or any other program that performs calculations on encrypted data. For example, the computation module 120 can include a tax preparation program, and can receive tax and financial data encoded by the encoding/encrypting module 108. In another example, the computation module 120 can include a genomic data analysis program to perform predictive analysis on genomic data encoded and/or encrypted by the encoding/encrypting module 108. As can be understood in the context of this disclosure, the computation module 120 can include any program, computation, or operation that can be performed on data. In various embodiments, the computation module 120 can perform computations on the received encoded and/or encrypted data and can generate an encoded and/or encrypted result, which can be transmitted to the computing device 102 for decryption and/or decoding by the decoding/decrypting module 110.

The computation module 120 can include one or more modules to perform homomorphic operations, such as an addition 124 module, a subtraction 126 module, a multiplication 128 module, a division 130 module, a sign testing 132 module, a comparison testing 134 module, and an equality testing 136 module. The addition 124 module, the subtraction 126 module, and the multiplication 128 module can perform operations on homomorphically encrypted data in accordance with the plain and ordinary meaning of these terms (e.g., adding two or more values, subtracting two or more values, and multiplying two or more values). Further, the division 130 module can perform division on homomorphically encrypted data by multiplying a number by a fractional value (e.g., a multiplication by ½ results in the same value as dividing by 2) or through approximate division, as discussed herein. The sign testing 132 module can evaluate encrypted data to determine if a value is negative or positive. The comparison testing 136 module can determine, for example, which value is larger between two given encrypted values. The equality testing 136 module can determine if two given values are equal. The operations of these modules 124, 126, 128, 130, 132, 134, and 136 are further explained in connection with FIGS. 2-6 of this disclosure.

The environment 100 also includes one or more users 140 to employ the computing device 102. The one or more users 140 can interact with the computing device 102 to perform a variety of operations.

The example processes (e.g., in FIGS. 2-6) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 2:
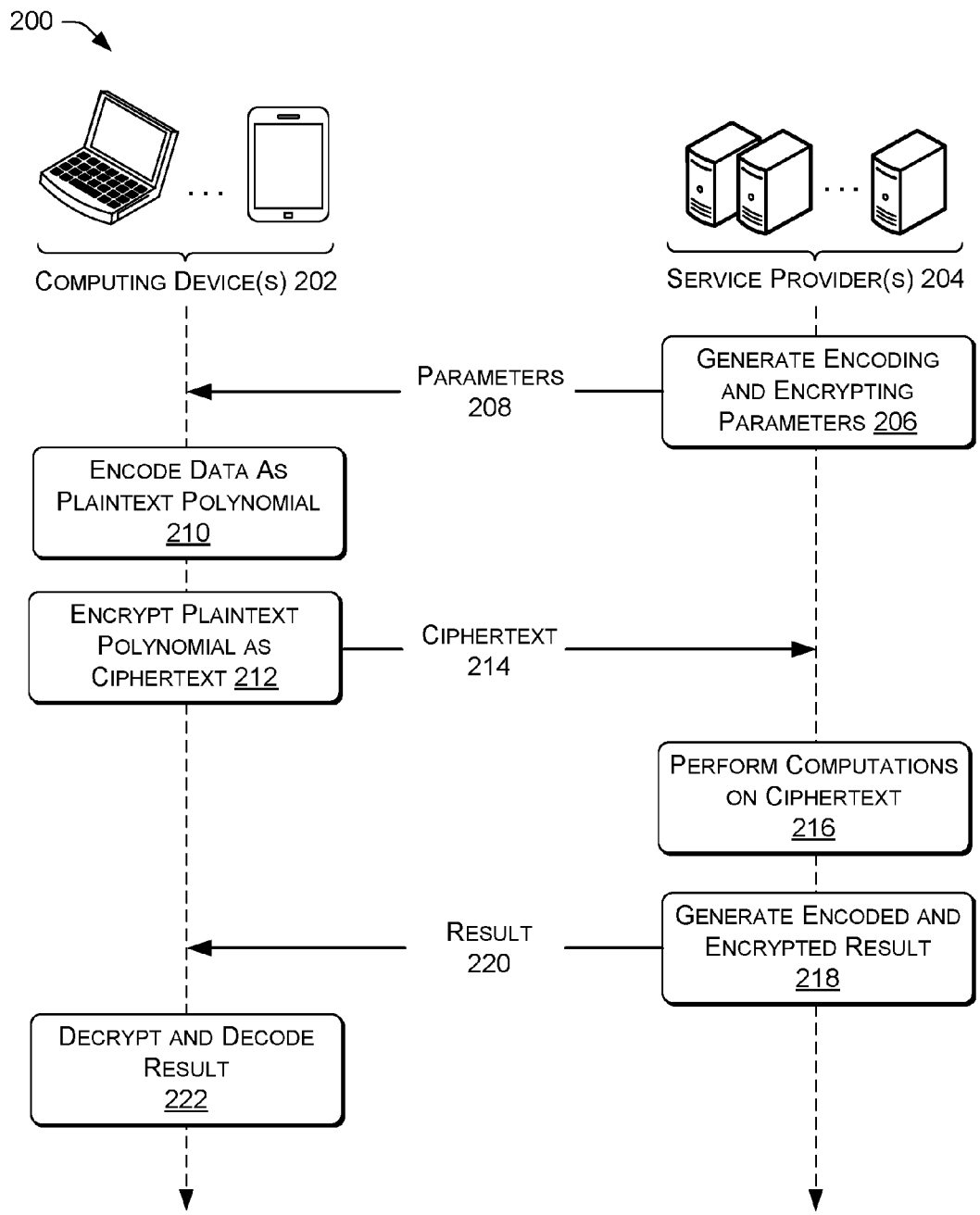
FIG. 2 illustrates an example process for managing secure computations on encrypted data.

FIG. 2 illustrates an example process 200 for managing secure computations on encrypted data, according to one example implementation. By way of example, the process 200 can be performed by and between computing device(s) 202 and service provider(s) 204, which can correspond to the computing device 102 and the service provider 112 in FIG. 1.

At 206, the service provider 204 can generate encoding and/or encrypting parameters using the parameter selection module 118, for example, of FIG. 1. In some embodiments, the service provider 204 generates the encoding and encrypting parameters in response to a request from the computing device 102. By way of example, the encoding and encrypting parameters can include, but is not limited to, a plaintext modulus T, based at least in part on a largest value for coefficients in a polynomial and/or based on the operations to be performed. In some embodiments, the plaintext modulus T can be set to be larger than any coefficient appearing in any plaintext polynomial at any point in the computations (e.g., coefficients in a "fresh" polynomial, or in a polynomial after operations have been performed, such as addition and/or multiplication). Further, as is described in connection with various figures of this disclosure, a plaintext modulus T can be based in part on an approximate division operation to be performed, or can be based in part on a sign testing operation to be performed, etc. However, as the plaintext modulus T increases, an error grows during homomorphic operations. Therefore, the plaintext modulus T can be set above any coefficient value that can occur in any encoded polynomial and/or can be set above any value required to perform the homomorphic operations discussed herein, without being higher than required, to prevent any unnecessary increase in the rate at which noise grows during operations.

At 208, the encoding and encrypting parameters can be transmitted to the computing device 202. In some embodiments, the parameters 208 can be encrypted using a public key associated with the computing device 202, to further ensure the security of the data processing.

The computing device 202 can receive the parameters 208, and at 210 can use the encoding parameters to encode data as a plaintext polynomial.

At 212, the data encoded in operation 210 is encrypted as a ciphertext, based at least in part on the parameters generated by the service provider 204. Because the data is encoded and encrypted by the computing device 202, the security and confidentiality of the data is preserved. In some embodiments, the operation 212 can include generating a public key for encrypting the encoded data, and a private key for decrypting the encrypted data. As can be understood in the context of this disclosure, the public and private keys can be generated at least in part based on the encoding and encrypting parameters generated by the service provider 204 in operation 206.

At 214, the ciphertext is transmitted to the service provider 204. After the ciphertext is received by the service provider 204, at operation 216, computations can be performed on the ciphertext. As can be understood in the context of this disclosure, computations to be performed on the ciphertext can be determined by a program running on the service provider 204, and can include, but is not limited to, an image analysis process, a genomic analysis algorithm, a prediction algorithm, financial transactions, etc. In the context of this disclosure, the operation 216 can include any combination or sequence of addition, subtraction, multiplication, division/approximate division, sign testing, comparison testing, and/or equality testing operations. Further, because of the process of encoding and encrypting the data, the computations can be performed on the data without decoding or decrypting the data. That is to say, homomorphic operations applied to the encoded and encrypted data can correspond to operations performed on the underlying data, without revealing any information about the contents of the data to the service provider 204.

At 218, an encoded and encrypted result is generated by the service provider 204. As discussed above, a result can be generated without decoding or decrypting the data, which therefore ensures the confidentiality of the data and the result of the operations. For example, if a prediction algorithm performs operations on encoded and encrypted data, the service provider 204 learns nothing about the prediction, other than the fact that operations were performed, which can correspond to a prediction.

At 220, an encoded and encrypted result is returned to the computing device 202, after which, the computing device 202 can use an associated secret key to decrypt and decode the result to obtain a plaintext result. In some embodiments, the secret key (and the public key, discussed above) can be based at least in part on the encoding and/or encrypting parameters received from the service provider 204, resulting in optimized homomorphic encryption. As can be understood in the context of this disclosure, a plurality of users can encrypt data using the public key, and contribute the data to a computation performed on the service provider 204, but only one user can have the secret key to decrypt any result from the service provider 204. In this manner, optimized computations can be performed remotely without revealing any information about a user's data.

Figure 3:
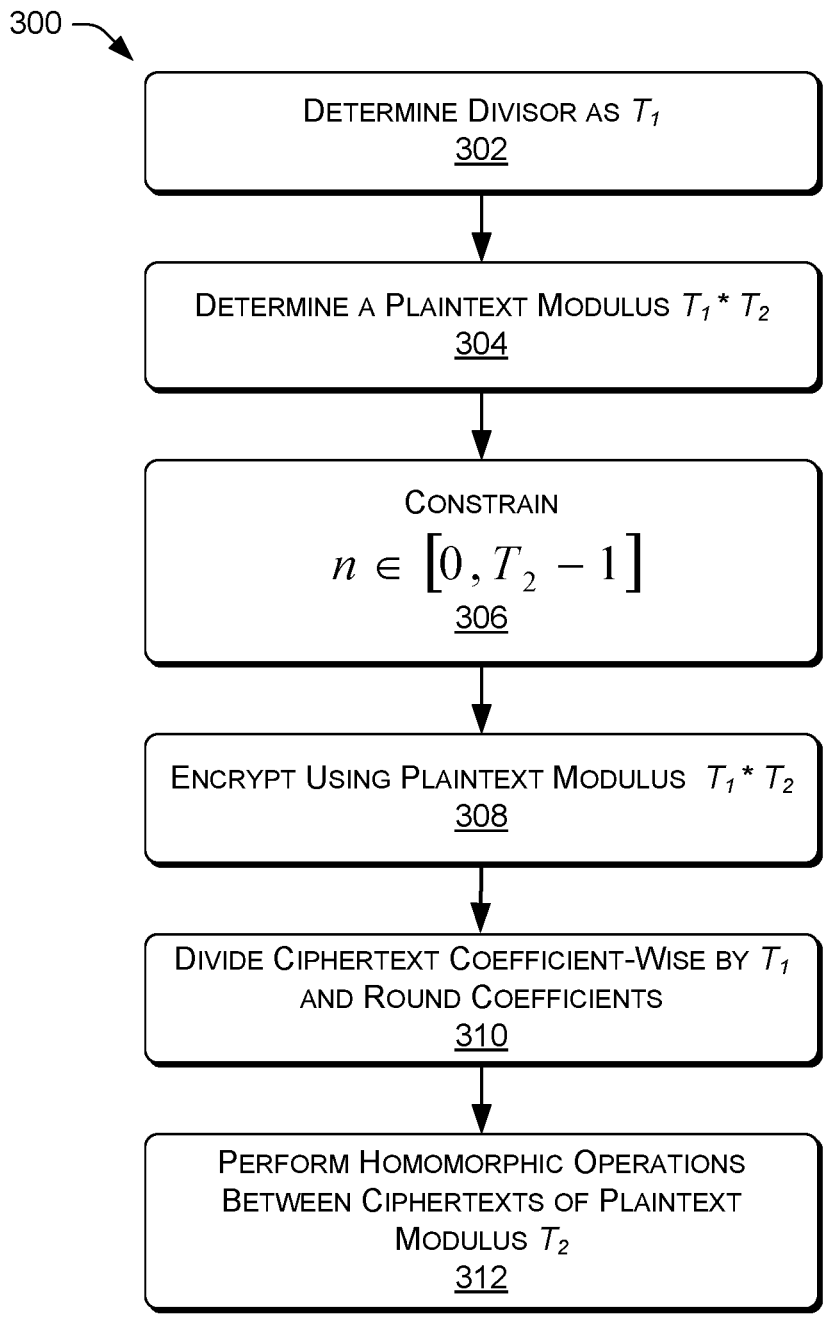
FIG. 3 illustrates an example process for approximate division on encrypted data.

FIG. 3 illustrates an example process 300 for performing approximate division on encrypted data, according to one example implementation. In one embodiment, the process 300 can be performed by service provider 112 and/or the computing device 102 of FIG. 1. However, processes can be performed in other environments and by other devices as well.

In general, the process 300 includes performing approximate division on encrypted data using plaintext modulus switching. One advantage of the process 300 is that it can provide a division operation without requiring a homomorphic multiplication operation, such as a fractional multiplication operation. For example, a series of operations can include a combination of addition and/or subtraction operations, followed by a division operation before returning an encrypted result. A fractional multiplication operation can be performed to provide a division operation (e.g., multiplying by ½ as an equivalent operation of dividing by 2). However, if the series of operations has not involved a multiplication step up until this point, the addition of a multiplication step can greatly increase the processing requirements and memory requirements to perform the operations. Therefore, by using the approximate division technique discussed herein, a multiplication step can be avoided either in part or in whole, thereby improving a functioning of the computer by reducing processing and memory requirements while performing homomorphic operations.

At 302, the operation determines a divisor as $T_1$. For example, a sequence of homomorphic operations can include dividing an encrypted number by $T_1$, wherein the sequence of homomorphic operations can be received as a program by the service provider 112 of FIG. 1. Thus, the parameter selection module 118 can analyze the program to determine if any approximate divisions can be performed, and if so, can also determine the divisor of such operations. By way of example and without limitation, an operation can include calculating an average of three numbers, in which case, the divisor would be 3.

At 304, the operation determines a plaintext modulus $T_1*T_2$. Collectively, the plaintext modulus can be represented as plaintext modulus T. As discussed above, the plaintext modulus T can be set to be larger than any coefficient appearing in any plaintext polynomial at any point in the computations (e.g., coefficients in a "fresh" polynomial, or in a polynomial after operations have been performed, such as addition and/or multiplication). In one simplified example, assuming a base=2, the coefficients present in a freshly encoded polynomial (i.e., before any operations are performed) are limited to either 0 or 1. However, in an example where the number 3 is encoded as x+1, and two encoded polynomials are added together, the coefficients in the polynomial grow to 2x+2. Thus, the plaintext modulus T can be set larger than the coefficients present in any polynomial (e.g., larger than 2) to avoid modular reduction, which can occur if the coefficients increase larger than the plaintext modulus T. Further, the plaintext modulus T can be determined such that the plaintext modulus T can be evenly divided by the divisor $T_1$ determined in the operation 302. By way of example and without limitation, the plaintext modulus $T_1*T_2$ can be determined as $3*2^{10}$, which would allow for an approximate division operation including 3 as a divisor. It can be understood in the context of this disclosure that the plaintext modulus of 3072 (i.e., $3*2^{10}$) would allow for a number of divisors beyond 3, such as 2, 3, 4, 6, 8, 12, 16, etc.

At 306, the operations can constrain $n \in [0, T_2-1]$. That is to say, the value(s) to be encoded/encrypted can be constrained between 0 and $T_2-1$. It can be understood in the context of this disclosure that the homomorphic scheme can encode positive and negative numbers within the range constrained in the operation 306 (e.g., with numbers between 0 and $T_2/2$ (not including $T_2/2$) encoded as positive numbers and numbers between $T_2/2$ and $T_2-1$ (not including $T_2/2$) encoded as negative number, or the like). Further, it can be understood in the context of this disclosure that the operations 302, 304, and/or 306 can be performed by the parameter selection module 118 in the service provider 112 of FIG. 1 to generate parameters, which can be sent to the client computing device for subsequent encoding and encrypting of the data to be operated on. Further, the operation 306 can include an operation of sending parameters (such as the plaintext modulus $T_1*T_2$) to the computing device after the parameters have been determined and/or generated.

At 308, the operation can encrypt values to be operated on using parameters determined by the parameter selection module 118, including the plaintext modulus $T_1*T_2$. Further, the operation 308 can include an operation of receiving parameters (such as the plaintext modulus $T_1*T_2$) at the computing device after the parameters have been sent by the service provider 112, for example, and the operation 308 can include sending the encrypted values to the service provider after the encryption has been performed at the computing device, for example, in accordance with FIG. 2.

At 310, the operation can divide a ciphertext coefficient-wise by $T_1$, and round the coefficients during the operation. This operation provides the approximate division operation as discussed herein, without using a multiplication-type operation, which accordingly reduces a processing requirement and memory requirement of performing the homomorphic operation. By way of example and without limitation, the operation 310 can be explained in connection with a division of an encrypted polynomial as encrypt(n)=$7x^5+2x^4+x^3+7$, using a divisor as $T_1$=3. Thus, the operation 310 is performed coefficient-wise as follows:

$$\frac{7}{3}x^5 + \frac{2}{3}x^4 + \frac{1}{3}x^3 + \frac{7}{3},$$

which can round to $2x^5+1x^4+0x^3+2$. It can be understood in the context of this disclosure that other rounding schemes can be used, instead of that shown above. For example, different rounding schemes can be used for each coefficient of the polynomial, or rounding schemes can include rules that prevent coefficients rounding down to zero, for example. In this manner, the coefficient-wise division can be optimized for each coefficient by applying an optimized rounding scheme to minimize error in the approximate division result.

Continuing with the example above, the ciphertext polynomial subject to the approximate division operation can be compared with a traditional division operation. For example, the polynomial encrypt(n)=$7x^5+2x^4+x^3+7$ can be evaluated at x=2, and the result can be divided by 3 to illustrate a result of $$\frac{7*2^5 + 2*2^4 + 2^3 + 7}{3} = \frac{271}{3} = 90.33.$$

In contrast, the approximate division operation returns a result of $2*2^5+1*2^4+0*2^3+2=82$. As can be understood in the context of this disclosure, various rounding operations can be utilized to reduce an error of the approximate division operation. By way of example, and without limitation, adding a rule to the rounding operation preventing a coefficient-wise division reducing a coefficient to zero would result in an approximate division operation of $2x^5+1x^4+1x^3+2$, which when evaluated at x=2, returns a result of $2*2^5+1*2^4+1*2^3+2=90$.

At 312, the operation can perform additional homomorphic operations on the ciphertext from the operation 310. However, subsequent operations can be performed between ciphertexts of plaintext modulus $T_2$. That is to say, after performing approximate division on the ciphertext with plaintext modulus $T_1*T_2$ using the divisor of $T_1$, the resulting ciphertext can use a plaintext modulus $T_2$ for subsequent operations. Further, the operation 312 can include transmitting the encrypted result to the computing device for decryption and decoding, in accordance with aspects of the disclosure.

Figure 4:
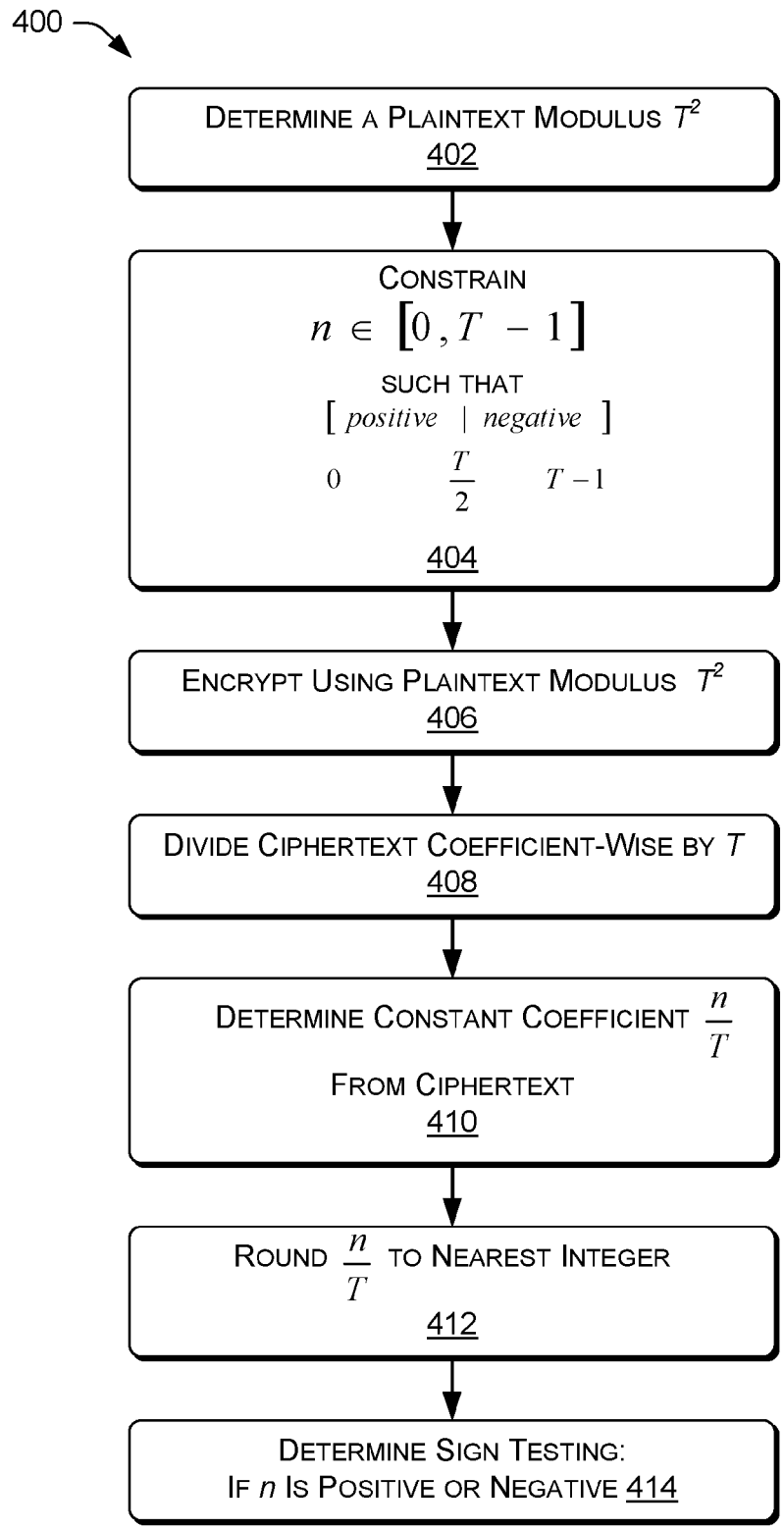
FIG. 4 illustrates an example process for performing sign testing on encrypted data.

FIG. 4 illustrates an example process 400 for performing sign testing on encrypted data, according to one example implementation. In one embodiment, the process 400 can be performed by the service provider 112 and/or the computing device 102 of FIG. 1. However, processes can be performed in other environments and by other devices as well.

In general, the process 400 includes performing sign testing on encrypted data to determine if the encrypted data represents a positive number or a negative number. This process provides an additional homomorphic operation that can be performed on encrypted data, thereby providing additional tools for applications. Further, this operation improves a functioning of a computer by quickly providing sign testing and by providing an encrypted result.

At 402, the operation determines a plaintext modulus $T^2$ (i.e., a plaintext modulus T*T). This operation can include determining the plaintext modulus T, which can be set to be larger than any coefficient appearing in any plaintext polynomial at any point in the computations (e.g., coefficients in a "fresh" polynomial, or in a polynomial after operations have been performed, such as addition and/or multiplication). As is discussed below, the plaintext polynomial $T^2$ is provided to perform operations involved in the sign testing.

At 404, the operations can constrain n∈[0, T−1]. That is to say, the value(s) to be encoded/encrypted can be constrained between 0 and T−1, which is less than the maximum possible range provided by the plaintext modulus $T^2$. Further, the encryption scheme can encode values within the range constrained above such that

[positive | negative]

0     $\frac{T}{2}$     T−1, which is to say that numbers between 0 and T/2 (not including T/2) can be encoded as positive numbers and numbers between T/2 and T−1 (not including T/2) can be encoded as negative number, or the like. Further, it can be understood in the context of this disclosure that the operations 402 and/or 404 can be performed by the parameter selection module 118 in the service provider 112 of FIG. 1 to generate parameters, which can be sent to the client computing device for subsequent encoding and encrypting of the data to be operated on. Further, the operation 404 can include an operation of sending parameters (such as the plaintext modulus $T^2$ and the constraint that values to be encoded be n∈[0, T−1]) to the computing device after the parameters have been determined and/or generated.

At 406, the operation can encrypt values to be operated on using parameters determined by the parameter selection module 118, including the plaintext modulus $T^2$. Further, the operation 406 can include an operation of receiving parameters (such as the plaintext modulus $T^2$ and the constraint that n∈[0, T−1]) at the computing device after the parameters have sent by the service provider 112, for example, and the operation 406 can include sending the encrypted values to the service provider after the encryption has been performed at the computing device, for example, in accordance with FIG. 2.

At 408, the operation can divide a ciphertext coefficient-wise by T. For example, for a polynomial encrypted as $a_n T^2 x^n + a_{n-1} T^2 x^{n-1} + \ldots a_1 T^2 x^1 + n + a_0 T^2$, dividing the polynomial coefficient-wise by T results in $$a_n T x^n + a_{n-1} T n^{n-1} + \ldots + a_1 T x^1 + \frac{n}{T} + a_0 T.$$

In some instances, the ciphertext polynomials include coefficients where each coefficient is a large non-zero number close to the size of the modulus Q, which is used in encoding the plaintext data prior to encryption, and is a large prime number. In some embodiments, the modulus Q can determine a coefficient space in a polynomial ring and/or a dimension of a lattice, which can determine a degree of polynomial to be handled. As a result of dividing the polynomial coefficient-wise by T, the coefficients are slightly smaller (roughly Q/T).

At 410, the operation determines the constant coefficient $$\frac{n}{T}$$

from the polynomial determined in the operation 408. In some embodiments, the constant coefficient can be isolated from the ciphertext by its position in the polynomial, as understood in the context of the encryption scheme.

At 412, the operation rounds the constant coefficient $$\frac{n}{T}$$

to the nearest integer. For example, because of the constraint that $n \in [0, T-1]$, the constant coefficient $$\frac{n}{T}$$

will be between 0 and 1, in this encryption scheme. Thus, the operation 412 returns a result of 0 or 1, depending on the value of n, and the rounding at the boundary. Furthermore, as described above, because the encryption scheme encodes positive values between 0 to T/2, and negative values between T/2 and T−1, at operation 414, the operation determines the sign testing of whether n is a positive value or a negative value. That is to say, if $$\frac{n}{T} = 0$$

then n is positive, while if $$\frac{n}{T} = 1,$$

then n is negative. In this manner, sign testing is provided as an operation within the homomorphic encryption system.

Furthermore, one or more additional operations can be performed on the polynomial determined in the operation 408 between ciphertexts of plaintext modulus T (instead of $T^2$). Further, the operation 414 can include transmitting the encrypted result to the computing device for decryption and decoding, in accordance with aspects of the disclosure.

Figure 5:
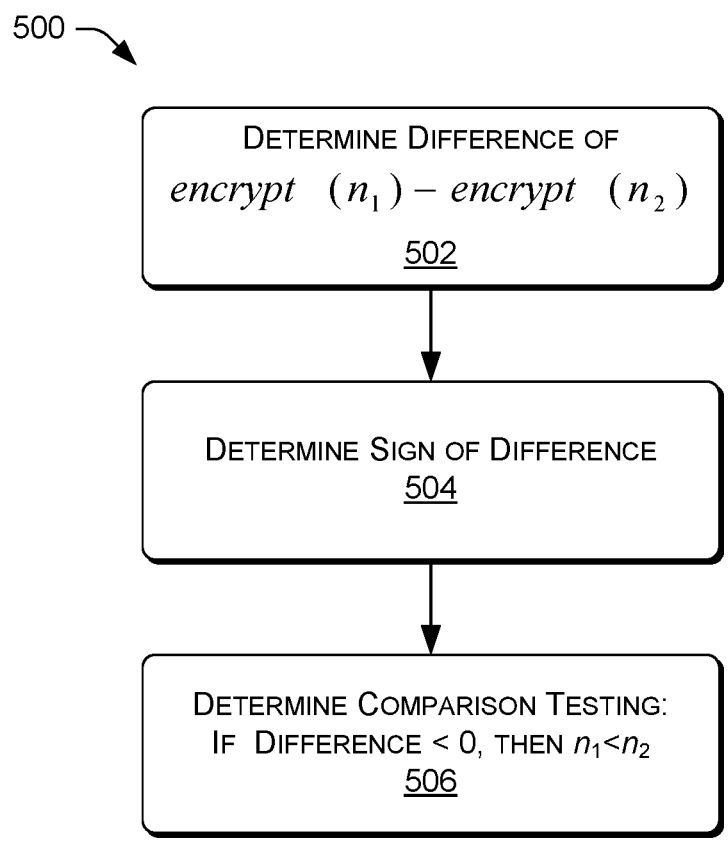
FIG. 5 illustrates an example process for performing comparison testing on encrypted data.

FIG. 5 illustrates an example process 500 for performing comparison testing on encrypted data, according to one example implementation. In one embodiment, the process 500 can be performed by the computation module 120 in the service provider 112 of FIG. 1. However, processes can be performed in other environments and by other devices as well. Further, process 500 can be used either singularly or in combination with the various systems and/or techniques discussed herein. As may be understood in the context of this disclosure, the process 500 can include any additional steps of receiving and/or transmitting parameters, encoding and/or encrypting data based at least in part on the parameters, transmitting and/or receiving encoded and/or encrypted data to/from the service provider, performing homomorphic operations on the data, and transmitting and/or receiving an encrypted/encoded result.

In general, the process 500 includes performing a comparison testing between at least two encrypted values to determine if one value is larger than another value. This process provides an additional homomorphic operation that can be performed on encrypted data, thereby providing additional tools for applications. Further, this operation improves a functioning of a computer by quickly providing comparison testing and by providing an encrypted result At 502, the operation determines a difference between a first encrypted number $n_1$ and a second encrypted number $n_2$. As illustrated in FIG. 5, this operation can be represented as encrypt($n_1$)−encrypt($n_2$).

At 504, the operation determines a sign of the difference. For example, the sign of the difference may be determined using the sign testing described in connection with FIG. 4 on the result obtained in the operation 502.

At 506, the operation determines if the difference between encrypt($n_1$)−encrypt($n_2$) is positive or negative, based at least in part on the determination made in the operation 504. For example, if $n_1 < n_2$, then the difference will be negative, while if $n_1 > n_2$, then the difference will be positive. In this manner, the sign testing, described in FIG. 4, can be combined with various homomorphic operations to build powerful tools within the homomorphic encryption scheme.

Figure 6:
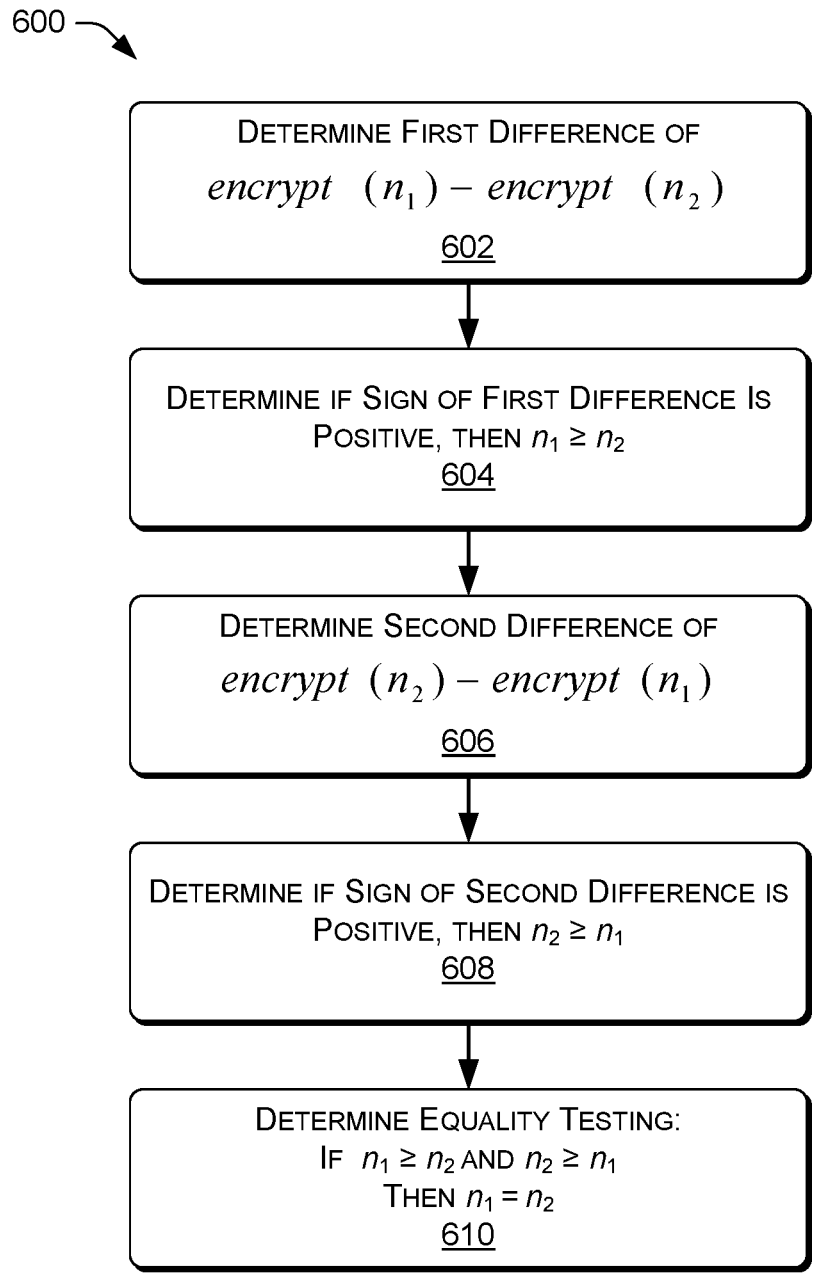
FIG. 6 illustrates an example process for performing equality testing on encrypted data.

FIG. 6 illustrates an example process 600 for performing equality testing on encrypted data, according to one example implementation. In one embodiment, the process 600 can be performed by the computation module 120 in the service provider 112 of FIG. 1. However, processes can be performed in other environments and by other devices as well. Further, process 600 can be used either singularly or in combination with the various techniques and/or systems discussed herein. As may be understood in the context of this disclosure, the process 600 can include any additional steps of receiving and/or transmitting parameters, encoding and/or encrypting data based at least in part on the parameters, transmitting and/or receiving encoded and/or encrypted data to/from the service provider, performing homomorphic operations on the data, and transmitting and/or receiving an encrypted/encoded result.

In general, the process 600 includes performing an equality testing between at least two encrypted values to determine if one value is equal to another value. This process provides an additional homomorphic operation that can be performed on encrypted data, thereby providing additional tools for applications. Further, this operation improves a functioning of a computer by quickly providing equality testing and by providing an encrypted result.

At 602, the operation determines a first difference between a first encrypted number $n_1$ and a second encrypted number $n_2$. As illustrated in FIG. 6, this operation can be represented as encrypt($n_1$)−encrypt($n_2$).

At 604, the operation determines if the sign of the first difference (determined in the operation 602) is positive. As may be understood in the context of this disclosure, the operation 604 can use the sign testing operation described in connection with FIG. 4 to determine the sign of the result determined in the operation 602. Thus, if the sign of the first difference is positive, this indicates that $n_1 \geq n_2$.

At 606, the operation determines a second difference between the second encrypted number $n_2$ and the first encrypted number $n_1$. As illustrated in FIG. 6, this operation can be represented as encrypt($n_2$)−encrypt($n_1$).

At 608, the operation determines if the sign of the second difference (determined in the operation 606) is positive. As may be understood in the context of this disclosure, the operation 608 can use the sign testing operation described in connection with FIG. 4. Thus, if the sign of the second difference is positive, this indicates that $n_2 \geq n_1$.

At 610, the operation determines whether the first and second encrypted numbers are equal, that is to say, whether $n_1=n_2$. Thus, by performing a two-way comparison testing in the operations 602, 604, 606, and 608, equality testing can be performed on the first and second encrypted numbers, $n_1$ and $n_2$, without the homomorphic encryption scheme knowing the values of the number or the result of the equality testing because the values and the results remain encrypted.

Moving forward, the equality testing and comparison testing can be combined to perform frequency counting on encrypted data. For example, performing a frequency count within a number set includes determining a number of occurrences that a value is present in the number set (e.g., a number of values above zero, a number of values equal to a particular number, etc.). After selecting a target number, for each number in the number set, the process can include performing equality testing between that particular number and the target number. Next, the total amount of numbers matching the target value can be determined as the frequency count. In this manner, the tools discussed herein can be combined to provide additional operations within the homomorphic encryption scheme.

Therefore, as described herein, optimized homomorphic operations can be performed on encrypted data without revealing the data and/or the result of the operations to the remote computing device in the homomorphic encryption system. Further, these homomorphic operations improve operation of a computer by improving processing and/or memory requirements for the homomorphic encryption by providing additional operations to be performed on encrypted data. Further, the optimizing of parameters and encodings discussed herein can also be used outside the strict context of homomorphic encryption applications, in any application where secure computations are required.

EXAMPLE CLAUSES

Example A, at least one device comprising: one or more processors; and memory storing modules that, when executed by the one or more processors, cause the at least one device to perform operations comprising: determining a plaintext modulus based on at least one homomorphic operation to be performed; receiving an encrypted polynomial representing at least one number, the encrypted polynomial encrypted based at least in part on the plaintext modulus; dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme; and transmitting the encrypted divided polynomial to a computing device.

Example B, the at least one device of Example A, wherein the dividing the encrypted polynomial by the divisor of the plaintext modulus avoids a homomorphic multiplication operation, thereby reducing a processing time of the one or more processors when performing the dividing.

Example C, the at least one device of Example A or Example B, wherein the operations further comprise constraining the at least one number to a range smaller than the plaintext modulus divided by the divisor.

Example D, the at least one device of any one of Examples A through C, wherein the operations further comprise: determining a constant coefficient term of the encrypted divided polynomial; and decrypting the constant coefficient term of the encrypted divided polynomial at the computing device, wherein the constant coefficient term of the encrypted divided polynomial indicates whether the at least one number is a positive number or a negative number upon decrypting the encrypted divided polynomial.

Example E, the at least one device of any one of Examples A through D, wherein the rounding scheme rounds the at least one coefficient divided by the divisor of the plaintext modulus to a nearest integer.

Example F, the at least one device of any one of Examples A through E, wherein the at least one homomorphic operation includes at least one of an approximate division, a sign testing, a comparison testing, and an equality testing.

Example G, the at least one device of any one of Examples A through F, wherein the plaintext modulus is a plaintext modulus $T^2$, wherein the divisor is a divisor T, and wherein the operations further comprise performing a homomorphic operation on the encrypted divided polynomial using a plaintext modulus T.

Example H, the at least one device of any one of Examples A through G, wherein the operations further comprise: determining a difference between a first encrypted polynomial and a second encrypted polynomial, wherein the difference is the encrypted polynomial representing the at least one number; determining a constant coefficient term of the encrypted divided polynomial; and decrypting the constant coefficient term of the encrypted divided polynomial at the computing device, wherein the constant coefficient term of the encrypted divided polynomial indicates that a first number encrypted as the first encrypted polynomial is larger than a second number encrypted as the second encrypted polynomial upon decrypting the encrypted divided polynomial.

While Example A through Example H are described above with respect to a device, it is understood in the context of this document that the content of Example A through Example H may also be implemented via a system, computer storage media, and/or a method.

Example I, a computer-implemented method for performing at least one homomorphic encryption operation by at least one processor, the method comprising: determining a plaintext modulus based on at least one homomorphic operation to be performed; receiving an encrypted polynomial representing at least one number, the encrypted polynomial encrypted based at least in part on the plaintext modulus; dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme; and transmitting the encrypted divided polynomial to a computing device.

Example J, the method of Example I, further comprising constraining the at least one number to a range smaller than the plaintext modulus divided by the divisor.

Example K, the method of Example I or Example J, further comprising: determining a constant coefficient term of the encrypted divided polynomial; and decrypting the constant coefficient term of the encrypted divided polynomial at the computing device, wherein the constant coefficient term of the encrypted divided polynomial indicates whether the at least one number is a positive number or a negative number upon decrypting the encrypted divided polynomial.

Example L, the method of any one of Examples I through K, wherein the rounding scheme rounds the at least one coefficient to a nearest integer.

Example M, the method of any one of Examples I through L, wherein the at least one homomorphic operation includes at least one of an approximate division, a sign testing, a comparison testing, and an equality testing.

Example N, the method of any one of Examples I through M, wherein the plaintext modulus is a plaintext modulus $T^2$, wherein the divisor is a divisor T, and wherein the method further comprises performing a homomorphic operation on the encrypted divided polynomial using a plaintext modulus T.

Example O, the method of any one of Examples I through N, further comprising: determining a difference between a first encrypted polynomial and a second encrypted polynomial, wherein the difference is the encrypted polynomial representing the at least one number; determining a constant coefficient term of the encrypted divided polynomial; and decrypting the constant coefficient term of the encrypted divided polynomial at the computing device, wherein the constant coefficient term of the encrypted divided polynomial indicates that a first number encrypted as the first encrypted polynomial is larger than a second number encrypted as the second encrypted polynomial upon decrypting the encrypted divided polynomial.

While Example I through Example O are described above with respect to a method, it is understood in the context of this document that the content of Example I through Example O may also be implemented via a device, system, and/or computer storage media.

Example P, one or more computer storage media comprising computer-executable instructions that, when executed by one or more processors, perform operations comprising: determining a plaintext modulus based on at least one homomorphic operation to be performed; transmitting the plaintext modulus to a computing device; receiving an encrypted polynomial representing at least one number, the encrypted polynomial encrypted based at least in part on the plaintext modulus; dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme; and transmitting the encrypted divided polynomial to the computing device.

Example Q, the one or more computer storage media as recited in Example P, wherein the operations further comprise constraining the at least one number to a range smaller than the plaintext modulus divided by the divisor.

Example R, the one or more computer storage media as recited in Example P or Example Q, wherein the rounding scheme rounds the at least one coefficient to a nearest integer.

Example S, the one or more computer storage media as recited in any one of Examples P through R, wherein the plaintext modulus is a plaintext modulus $T^2$, wherein the divisor is a divisor T, and wherein the operations further comprise performing a homomorphic operation on the encrypted divided polynomial using a plaintext modulus T.

Example T, the one or more computer storage media as recited in any one of Examples P through S, wherein the operations further comprise: determining a difference between a first encrypted polynomial and a second encrypted polynomial, wherein the difference is the encrypted polynomial representing the at least one number; determining a constant coefficient term of the encrypted divided polynomial; and decrypting the constant coefficient term of the encrypted divided polynomial at the computing device, wherein the constant coefficient term of the encrypted divided polynomial indicates that a first number encrypted as the first encrypted polynomial is larger than a second number encrypted as the second encrypted polynomial upon decrypting the encrypted divided polynomial.

While Example P through Example T are described above with respect to a computer storage media, it is understood in the context of this document that the content of Example P through Example T may also be implemented via a device, system, and/or a method.

CONCLUSION

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. At least one device comprising:
   one or more processors; and
   memory storing modules that, when executed by the one or more processors, cause the at least one device to perform operations comprising:
   determining a plaintext modulus based on at least one homomorphic operation to be performed;
   determining a difference between a first encrypted polynomial and a second encrypted polynomial to generate an encrypted polynomial representing at least one number;
   receiving the encrypted polynomial, the encrypted polynomial encrypted based at least in part on the plaintext modulus;
   dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme;
   determining a constant coefficient term of the encrypted divided polynomial, wherein the constant coefficient term of the encrypted divided polynomial indicates that a first number encrypted as the first encrypted polynomial is larger than a second number encrypted as the second encrypted polynomial upon decrypting the encrypted divided polynomial; and
   transmitting the encrypted divided polynomial to a computing device.

2. The at least one device of claim 1, wherein the dividing the encrypted polynomial by the divisor of the plaintext modulus avoids a homomorphic multiplication operation, thereby reducing a processing time of the one or more processors when performing the dividing.

3. The at least one device of claim 1, wherein the operations further comprise constraining the at least one number to a range smaller than the plaintext modulus divided by the divisor.

4. The at least one device of claim 1, wherein the operations further comprise:
   determining a constant coefficient term of the encrypted divided polynomial; and
   decrypting the constant coefficient term of the encrypted divided polynomial at the computing device, wherein the constant coefficient term of the encrypted divided polynomial indicates whether the at least one number is a positive number or a negative number upon decrypting the encrypted divided polynomial.

5. The at least one device of claim 1, wherein the rounding scheme rounds the at least one coefficient divided by the divisor of the plaintext modulus to a nearest integer.

6. The at least one device of claim 1, wherein the at least one homomorphic operation includes at least one of an approximate division, a sign testing, a comparison testing, and an equality testing.

7. The at least one device of claim 1, wherein the plaintext modulus is a plaintext modulus $T^2$, wherein the divisor is a divisor T, and wherein the operations further comprise performing a homomorphic operation on the encrypted divided polynomial using a plaintext modulus T.

8. The at least one device of claim 1, wherein the operations further comprise:
   decrypting the constant coefficient term of the encrypted divided polynomial.

9. A computer-implemented method for performing at least one homomorphic encryption operation by at least one processor, the method comprising:
   determining a plaintext modulus based on at least one homomorphic operation to be performed;
   determining a difference between a first encrypted polynomial and a second encrypted polynomial to generate an encrypted polynomial representing at least one number;
   receiving the encrypted polynomial, the encrypted polynomial encrypted based at least in part on the plaintext modulus;
   dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme;
   determining a constant coefficient term of the encrypted divided polynomial, wherein the constant coefficient term of the encrypted divided polynomial indicates that a first number encrypted as the first encrypted polynomial is larger than a second number encrypted as the second encrypted polynomial upon decrypting the encrypted divided polynomial; and
   transmitting the encrypted divided polynomial to a computing device.

10. The method of claim 9, further comprising constraining the at least one number to a range smaller than the plaintext modulus divided by the divisor.

11. The method of claim 9, further comprising:
   decrypting the constant coefficient term of the encrypted divided polynomial at the computing device, wherein the constant coefficient term of the encrypted divided polynomial indicates whether the at least one number is a positive number or a negative number upon decrypting the encrypted divided polynomial.

12. The method of claim 9, wherein the rounding scheme rounds the at least one coefficient to a nearest integer.

13. The method of claim 9, wherein the at least one homomorphic operation includes at least one of an approximate division, a sign testing, a comparison testing, and an equality testing.

14. The method of claim 9, wherein the plaintext modulus is a plaintext modulus $T^2$, wherein the divisor is a divisor T, and wherein the method further comprises performing a homomorphic operation on the encrypted divided polynomial using a plaintext modulus T.

15. The method of claim 9, further comprising:
   decrypting the constant coefficient term of the encrypted divided polynomial.

16. One or more non-transitory computer storage media comprising computer-executable instructions that, when executed by one or more processors, perform operations comprising:
   determining a plaintext modulus based on at least one homomorphic operation to be performed;
   transmitting the plaintext modulus to a computing device;
   determining a difference between a first encrypted polynomial and a second encrypted polynomial to generate an encrypted polynomial representing at least one number;
   receiving the encrypted polynomial, the encrypted polynomial encrypted based at least in part on the plaintext modulus;
   dividing the encrypted polynomial by a divisor of the plaintext modulus to generate an encrypted divided polynomial, the dividing performed coefficient-wise on at least one coefficient of the encrypted polynomial, the dividing including rounding the at least one coefficient according to a rounding scheme;
   determining a constant coefficient term of the encrypted divided polynomial, wherein the constant coefficient term of the encrypted divided polynomial indicates that a first number encrypted as the first encrypted polynomial is larger than a second number encrypted as the second encrypted polynomial upon decrypting the encrypted divided polynomial; and
   transmitting the encrypted divided polynomial to the computing device.

17. The one or more non-transitory computer storage media as recited in claim 16, wherein the operations further comprise constraining the at least one number to a range smaller than the plaintext modulus divided by the divisor.

18. The one or more non-transitory computer storage media as recited in claim 16, wherein the rounding scheme rounds the at least one coefficient to a nearest integer.

19. The one or more non-transitory computer storage media as recited in claim 16, wherein the plaintext modulus is a plaintext modulus $T^2$, wherein the divisor is a divisor T, and wherein the operations further comprise performing a homomorphic operation on the encrypted divided polynomial using a plaintext modulus T.

20. The one or more non-transitory computer storage media as recited in claim 16, wherein the operations further comprise:
   decrypting the constant coefficient term of the encrypted divided polynomial.

* * * * *